United States Patent [19]
Garvin, Jr. et al.

[11] Patent Number: 5,220,942
[45] Date of Patent: Jun. 22, 1993

[54] EXTENSIBLE INDICATOR POST FOR VALVE ASSEMBLIES

[76] Inventors: Joseph D. Garvin, Jr., 8055 Lehman Rd., Decatur, Ill. 62521; Timothy M. Logman, 317 E. Main St., Monticello, Ill. 61856; William L. Royal, 325 O'Hara Dr., Albertville, Ala. 35930; Jeffrey A. Tapparo, 6920 Marshwood Ct., Colorado Springs, Colo. 80918

[21] Appl. No.: 871,166

[22] Filed: Apr. 20, 1992

[51] Int. Cl.$^5$ ............................................. F16K 37/00
[52] U.S. Cl. .................................... 137/556; 137/369; 137/370; 116/277
[58] Field of Search ............... 137/368, 369, 370, 556; 116/277

[56] References Cited

U.S. PATENT DOCUMENTS

| 307,753 | 11/1884 | Earle | 137/369 |
| 407,955 | 7/1889 | Kallaher et al. | 137/369 |
| 1,120,144 | 12/1914 | Hine | 137/369 |
| 3,452,766 | 7/1969 | Fenster | 137/556 |
| 4,448,148 | 5/1984 | Gain, Jr. | 137/556 |
| 4,708,160 | 11/1987 | Sharp et al. | 137/368 |

Primary Examiner—A. Michael Chambers
Attorney, Agent, or Firm—Cushman, Darby & Cushman

[57] ABSTRACT

An indicator post for indicating an open or closed condition of a valve in a piping system has a post which has a rotatable operating nut at the top of a post head. The post head is attached on its lower end to an upper barrel having a telescoping lower barrel within it. The operating nut is also attached to a solid upper stem. A hollow lower stem surrounds the lower end of the solid stem and has a lower end attached to a valve assembly socket for mating with a valve stem. The hollow stem is freely slidable along a large portion of the solid stem so that the assembly may accommodate a large range of valve stem-to-operating nut distances. The operating nut carries a threaded sleeve which is preferably constructed of molded, engineering-grade plastic.

9 Claims, 3 Drawing Sheets

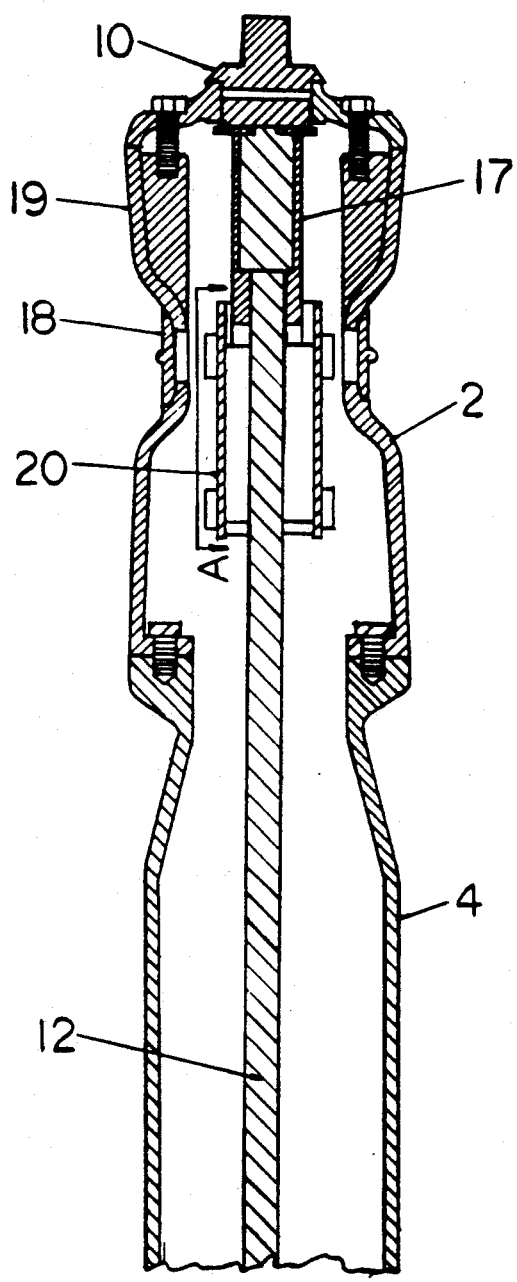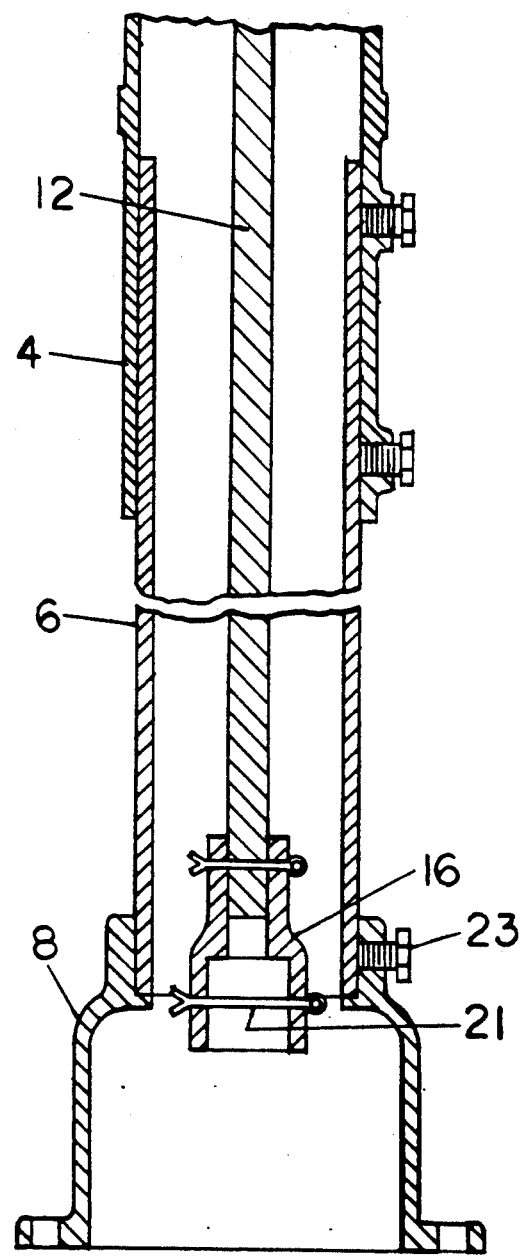
PRIOR ART
FIGURE 1A
PRIOR ART
FIGURE 1B

EXTENSIBLE INDICATOR POST FOR VALVE ASSEMBLIES

BACKGROUND OF THE INVENTION

1. Field of the Invention

The present invention relates to piping systems for municipal water delivery and the like, and more specifically to indicator posts for indicating an open or closed condition of a valve in such a piping system.

2. Description of the Related Art

FIGS. 1A and 1B depict an indicator post for a valve as known in the prior art. The indicator post comprises a post head 2 that has an upper barrel 4 attached at its lower end. The upper barrel 4 is preferably attached to the post head 2 by means of bolts, as is illustrated in FIG. 1A. A rotatable operating nut 10 is positioned at the upper end of the post head 2 and is connected to a stem 12. The stem 12 is connected to a valve stem socket 16, preferably by means of cotter pins as is illustrated in FIG. 1B.

It should be noted that the two cotter pins running through the valve stem socket 16 are depicted as parallel for ease of viewing only. These pins are preferably skewed relative to each other, so that the axis of one pin is perpendicular to the other. This arrangement provides improved stress handling characteristics.

A lower barrel 6 fits inside the upper barrel 4 at the lower end of the upper barrel 4 and is connected to a valve assembly bell 8 at its lower end. The valve assembly bell 8 preferably retains the lower end of barrel 6 by retaining bolts, as is illustrated in FIG. 1B. The operating nut 10 is preferably made from cast brass, the stem 12 is preferably made from steel, the lower barrel 6 is preferably made from ductile iron, and the remaining parts are preferably made from cast iron.

An indicator assembly 19 is mounted on the upper end of barrel 4. An externally threaded sleeve 17 is attached to the lower end of operating nut 10 and carries a sleeve 20 which is provided with an internal threaded collar engaging the sleeve 17. The body of sleeve 20 is visible through one or more transparent windows 18 in the post head 2. The indicator assembly 19 is conventionally made of metal, while the windows 18 may be made of glass, plexiglass, or a similar transparent material.

In use, the lower end of the valve assembly bell 8 is attached to a valve assembly, and the valve stem socket 16 is attached to the stem of the valve. The bell 8 may be attached to the valve assembly with bolts, while the valve stem socket 16 may be attached to the valve stem by a cotter pin 21 as shown in FIG. 1B. The valve assembly is generally buried underground, and in such cases, the lower portion of the indicator post is buried as well.

To alter the position of the valve, the operating nut 10 is rotated to a desired position so that a legend provided on the body of sleeve 20 is visible in the window 18 corresponding to the position of valve as being either open or closed. This action is transmitted through the stem 12 and the valve assembly socket 16 to the valve assembly, which is altered accordingly. The action also serves to rotate the indicator assembly sleeve 20 and thereby change the portion of the indicator assembly sleeve 20 visible through the transparent window 18. Thus, the new condition of the valve assembly is shown in the transparent window 18.

Several disadvantages have been recognized in the prior art design. Indicator posts are sometimes exposed to extremely high temperatures, as in the case of a fire. Brass operating nuts in prior art designs tended to melt inside the indicator post. When the brass solidified, the indicator post stem was frozen and the attached valve could not be opened or closed. Also, the brass operating nut according to the prior art required lubricant on its metal-to-metal surfaces and thus required that the indicator post be periodically maintained. Finally, the brass operating nut is relatively expensive to fabricate due to the use of comparatively expensive materials and laborious machining processes.

The prior art design is also disadvantageous in that indicator posts are installed under a variety of conditions that require varying distances between the operating nut 10 and the valve stem socket 16. In the prior art design, the stem 12 fits inside the operating nut 10 and provides four to five inches of adjustability. Thus, the nut-to-valve distance was variable within a range of only four to five inches. This was insufficient for many applications, and installation in these situations required disassembly in the field, cutting off part of the stem to the desired length, and reassembly of the indicator post. This was often an unsatisfactory solution, since the relative height of the installation site wa often changed by site grading or other activities after the indicator post had been installed.

The limited extensibility was further disadvantageous in that the indicator posts had to be manufactured, stored, and shipped in the longest length for which they could be used. This necessitated the use of excessive storage and shipping space. It also reduced the reliability of the finished product somewhat, since the larger units were more likely to be damaged in storage or transit.

SUMMARY OF THE INVENTION

It is an object of the present invention to provide an indicator post having improved operational characteristics.

It is a further object of the present invention to provide an indicator post having simplified field adjustment characteristics.

It is a further object of the present invention to provide an indicator post having improved characteristics for storage and shipment.

It is a further object of the present invention to provide an indicator post having a lower manufacturing cost.

To achieve the above-named objects, an indicator post having an adjustable stem has been developed. The post has a rotatable operating nut at the top of a post head. The post head is attached on its lower end to an upper barrel. The upper barrel has a lower barrel disposed within its lower end and freely slidable therein. A valve assembly bell is attached to the lower end of the lower barrel. In this manner, the entire indicator post may be adjusted to a variety of lengths to accommodate valves that ma be buried at various depths underground.

The operating nut is also attached to a solid upper stem. A hollow lower stem surrounds the lower end of the solid stem and has a lower end attached to a valve assembly socket for mating with a valve stem. The hollow stem is freely slidable along a large portion of the solid stem so that the assembly may accommodate a large range of valve stem-to-operating nut distances.

In a preferred embodiment of the present invention, a threaded portion of operating nut is constructed of molded, engineering-grade plastic while the remainder of the nut is of brass. The plastic threaded portion is employed to move the indicator sign relative to a viewing window. Fabrication of the threaded portion of the operating nut from this type of plastic is advantageous for several reasons. As noted above, indicator posts are sometimes exposed to fires, and in the event a brass operating nut is melted and resolidifies, the indicator post stem could be in a position so that the attached valve could not be opened or closed. A plastic threaded portion for the indicator on operating nut according to the present invention overcomes this disadvantage since it tends to disperse when melted, thus leaving the stem accessible so that the valve may be opened and closed while the indicator is non-functional.

Another advantage of a plastic operating nut according to the present invention is that the plastic nut is self-lubricating, whereas the brass operating nut according to the prior art required periodic lubrication, as noted above.

The combination of brass and plastic materials to produce the operating nut according to the present invention is further advantageous in that it is relatively inexpensive to manufacture as compared to a entirely brass operating nut. This advantage is due to the use of less expensive materials to fabricate the nut and to the relative ease of machining this material.

Since the nut-valve distance is adjustable along a large portion of the length of the stems as opposed to only four or five inches as in prior art indicator posts, the telescoping stem arrangement allows the indicator post according to the present invention to be used in applications requiring a wider range of lengths between the operating nut and the valve assembly.

Further, while the limited extensibility of the prior art design required that the indicator posts be manufactured, stored and shipped in their longest configuration, the indicator post according to the present invention may be assembled, stored and shipped in a fully compressed configuration and then extended to a desired length in the field.

The indicator post according to the present invention is also advantageous in that the free extensibility of the stem eliminates disassembly, cutting off a portion of the stem, and reassembly in the field, as was required in the prior art designs.

BRIEF DESCRIPTION OF THE DRAWINGS

FIG. 1A is a cross-section view of an upper portion of a prior art indicator post.

FIG. 1B is cross-section view of a lower portion of the prior art indicator post of FIG. 1A.

DETAILED DESCRIPTION OF THE INVENTION

Figure 2A:
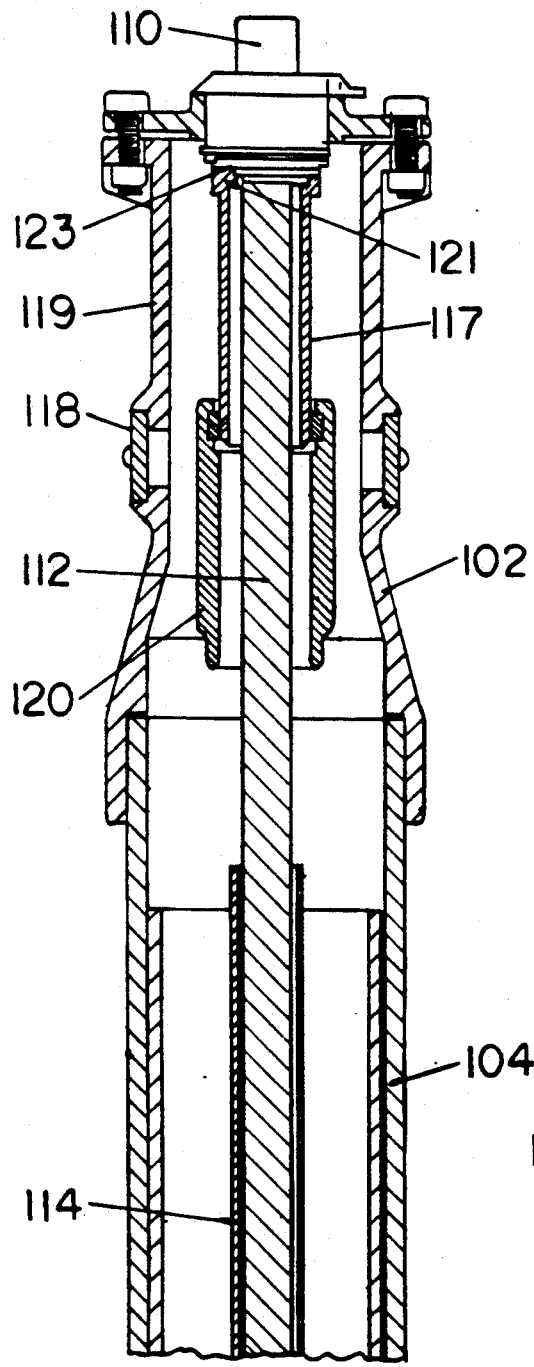
FIG. 2A is a cross-section view of an upper portion of an indicator post according to the present invention.
Figure 2B:
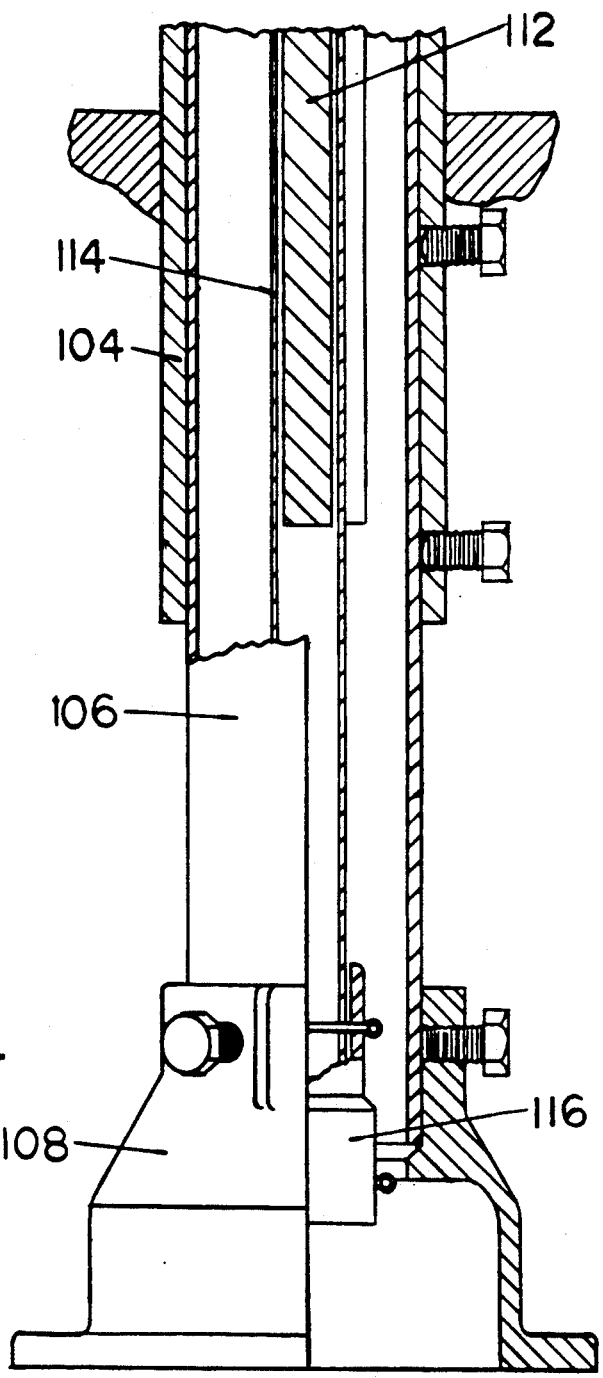
FIG. 2B is a partial cross-section view of a lower portion of an indicator post according to the present invention.

FIGS. 2A and 2B depict an indicator post for a valve according to the present invention. The indicator post comprises a post head 102 that has an upper barrel 104 attached at its lower end. The upper barrel 104 is preferably attached to the post head 102 by means of bolts, as is illustrated in FIG. 2A. A rotatable operating nut 110 is positioned at the upper end of the post head 102 and is connected to an upper stem 112. The upper stem 112 has a hollow lower stem 114 surrounding its lower end, and the lower stem 114 is connected to a valve stem socket 116, preferably by means of cotter pins as is illustrated in FIG. 2B. The upper stem 112 and the lower stem 114 preferably have a square cross-section, or some functionally similar shape, that allows the upper stem to engage the lower stem when the upper stem is rotated.

As in the prior art design, the axis of the two cotter pins running through the valve stem socket 116 are preferably skewed relative to each other to provide improved stress handling such as higher torque loads.

A lower barrel 106 fits telescopically inside the upper barrel 104 at the lower end of the upper barrel 104 and is connected to a valve assembly bell 108 at its lower end. The valve assembly bell 108 is preferably attached to the lower barrel 104 by bolts, as is illustrated in FIG. 2B.

The threaded sleeve portion 117 of the operating nut 110 is preferably made from molded engineering-grade plastic such as polyethylene, the upper stem 112 is preferably made from carbon steel, the lower stem 114 is preferably made from steel, the lower barrel 106 is preferably made from ductile iron, and the remaining parts are preferably made from cast iron. The upper end of sleeve 117 is mounted on a collar 121 depending from the brass nut 110 and is held in position by a pin 123 passing through aligned holes provided in the collar 121 and the enlarged end of the sleeve 117.

An indicator assembly 119 is attached to the lower end of operating nut 110 by means of the threaded sleeve 117 just as is the prior art device of FIGS. 1A and 1B. The sleeve 120 is visible through a transparent window 118 in the post head 102. Indicia such as labels indicating "open" and "closed" are appropriately spaced axially along the sleeve 120 so that as the sleeve 120 is shifted parallel to the stem 112 one of the labels will be visible in the window 118. The indicator assembly 119 is conventionally made of metal, while the window 118 may be made of glass, plexiglass, or a similar transparent material.

In use, the lower end of the valve assembly bell 108 is attached to a valve assembly, and the valve stem socket 116 is attached to the stem of the valve. The bell 108 may be attached to the valve assembly with bolts, while the valve stem socket 116 may be attached to the valve stem by a cotter pin as shown in FIG. 2B. The valve assembly is generally buried underground, and in such cases, the lower portion of the indicator post is buried as well.

To alter the position of the valve, the operating nut 110 is rotated to a desired position. This action is transmitted through the stem 112 and the valve assembly socket 116 to the valve assembly, which is altered accordingly. The action also serves to translate the indicator sleeve 120 and thereby change the portion of the indicator sleeve 120 visible through the transparent window 118. Thus, the new condition of the valve assembly is shown in the transparent window 118.

Figure 3:
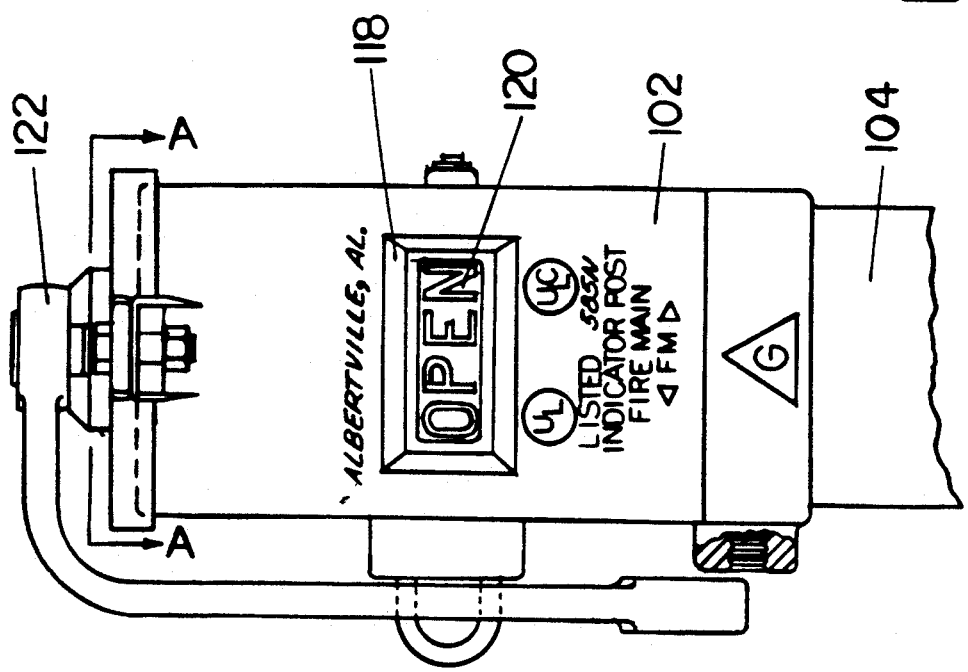
FIG. 3 is an elevational view of the post head of an indicator post according to the present invention.

FIG. 3 depicts an exterior view of a post head 102 according to the present invention. Post head 102 is connected to upper barrel 104 at its lower end. Transparent window 118 displays a portion of indicator assembly sleeve 120 corresponding to the current condition of the valve. Operating wrench 122 is attached to the operating nut and is used by an operator to rotate the operating nut in order to open and close the valve. The operating wrench is preferably made of ductile iron.

Figure 4:
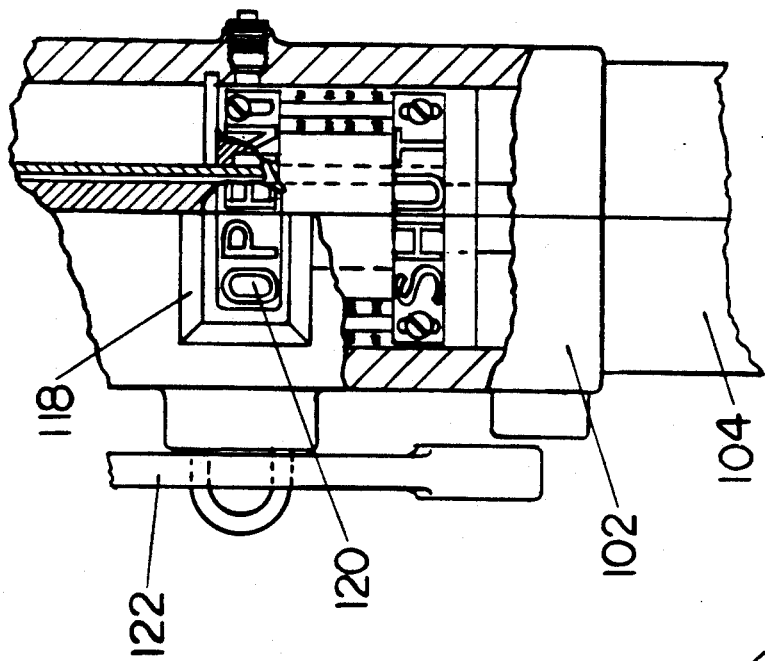
FIG. 4 is a partial cross-section view of the post head of an indicator post according to the present invention.

FIG. 4 depicts a partial cross-section of the post head 102 according to the present invention, showing the interrelationship of the various components in more detail. As before, post head 102 is connected to upper barrel 104 at its lower end. Transparent window 118 displays a portion of indicator assembly 120 corresponding to the current condition of the valve. Operating wrench 122 is attached to the operating nut and is used by an operator to rotate the operating nut in order to open and close the valve.

Figure 5:
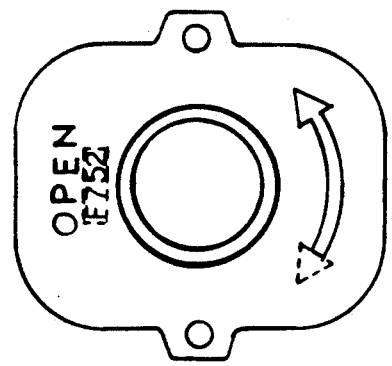
FIG. 5 is an elevational view of the post cap of an indicator post according to the present invention.

FIG. 5 depicts an end cap of the post head as seen along line A—A in FIG. 3. This end cap may be used to form the top surface of the post head.

While preferred embodiments of the invention have been shown and described, it will be appreciated by those skilled in the art that changes may be made in these embodiments without departing from the principles and the spirit of the invention, the scope of which is defined in the claims.

What is claimed is:

1. An indicator post for indicating an operative state of a valve, said indicator post comprising:
   an indicator post housing;
   operating means located at a first end of said housing, said operating means being rotatable in relation to said housing;
   a first stem having a first end located within said housing and being connected to said operating means;
   a second stem having a first end disposed around said second end of said first stem opposite said first end of said first stem, said second stem being relatively shiftable on said first stem so that a longitudinal dimension of said stems is changeable, said second stem being engagable with said first stem along a major portion of the longitudinal dimensions of both stems so that torque can be transmitted through said first stem to said second stem; and
   means for mating with a valve stem, said mating means being located on said second end of said second stem opposite said first end of said second stem.

2. The indicator post of claim 1, said indicator post housing comprising:
   said operating means being located at a first end of said post housing; and
   a first barrel having a first end attached to said post housing at a second end of said post housing opposite said first end of said post housing.

3. The indicator post of claim 2, wherein said first barrel has a first end and a second barrel is provided having a first end and a second end,
   said first end of said second barrel being located within said first barrel at a second end of said first barrel opposite said first end of said first barrel so that said barrels are telescopically movable relative to each other, said stems being disposed within said barrels.

4. The indicator post of claim 2, further comprising:
   a bell for mating with a valve housing, said bell being located on a second end of said second barrel opposite said first end of said first barrel.

5. The indicator post of claim i, further comprising:
   a window located on said post housing for providing an exterior view into said post housing, and
   an indicator assembly having labels indicative of at least one operating state of said valve, said indicator assembly being connected to said operating means and around said first stem so as to be movable relative to said window, wherein
   one of said labels is visible through said window while viewing of the other label is obstructed.

6. The indicator post of claim 1, further comprising:
   an operating wrench for rotating said operating means, said wrench being disposed on said operating means outside said post housing.

7. The indicator post of claim 1, wherein said operating means comprises a member made at least in part of non-metallic material.

8. The indictor post of claim 1, wherein said second stem is freely slidable over said second end of said first stem.

9. The indicator post of claim 1, wherein said first stem and said second stem each has a substantially square cross-section.

* * * * *